（12）United States Patent
Yoo et al.

(10) Patent No.: US 7,911,966 B2
(45) Date of Patent: Mar. 22, 2011

(54) DETERMINING WIRELESS DATA RATES CAPABILITY FOR PACKET DATA COMMUNICATIONS

(75) Inventors: Doosun Yoo, San Diego, CA (US); Won Sik Kim, San Diego, CA (US); Kotaro Matsuo, Poway, CA (US)

(73) Assignee: Kyocera Corporation, Kyoto (JP)

( * ) Notice: Subject to any disclaimer, the term of this patent is extended or adjusted under 35 U.S.C. 154(b) by 965 days.

(21) Appl. No.: 11/755,664

(22) Filed: May 30, 2007

(65) Prior Publication Data

US 2008/0298447 A1 Dec. 4, 2008

(51) Int. Cl.
*H04L 3/14* (2006.01)
(52) U.S. Cl. ........ 370/252; 370/230; 370/253; 370/329; 455/557
(58) Field of Classification Search .................. 370/329, 370/252, 253, 230; 455/557, 552.1
See application file for complete search history.

(56) References Cited

U.S. PATENT DOCUMENTS

| | | | |
|---|---|---|---|
| 2006/0142049 A1 | 6/2006 | Chan | |
| 2006/0227727 A1 | 10/2006 | Semper | |
| 2007/0091788 A1 | 4/2007 | Rajkotia et al. | |
| 2008/0039088 A1* | 2/2008 | Fukushima et al. | 455/436 |
| 2008/0049713 A1* | 2/2008 | Yam | 370/349 |
| 2008/0291856 A1* | 11/2008 | Li et al. | 370/311 |

FOREIGN PATENT DOCUMENTS

WO   WO 2007/053072   5/2007

* cited by examiner

*Primary Examiner* — Temica M Beamer

(57) ABSTRACT

A wireless device, system, and method that determines data rate capability for communicating packet data is described. The wireless device comprises a RF component, a controller, and a means for enabling communications. The RF component is configured to communicate a plurality of packet data at a first data rate capability and a second data rate capability, in which the second data rate is faster than the first data rate. The controller is communicatively coupled to RF component, and the controller is configured to monitor a physical layer data field value, a forward traffic channel data field value, and a reverse traffic channel data field value. The physical layer data field value is associated with the physical transmission of packets from the RF component. The forward traffic channel data field value is associated with forward channel communications, and the reverse traffic channel data field value that is associated with reverse channel communications. The means for enabling communications at the second data rate capability occurs when the physical layer data field value, the forward traffic channel data field value, and the reverse traffic channel data field value indicate that communications are supported for the second data rate capability.

19 Claims, 3 Drawing Sheets

DETERMINING WIRELESS DATA RATES CAPABILITY FOR PACKET DATA COMMUNICATIONS

FIELD OF THE INVENTION

This invention relates to determining data rates capability for packet data communications. More particularly, the invention relates to a wireless device, a wireless network system and method for determining data rates capability for packet data communications.

BACKGROUND

There are multiple wireless radio broadband data standards including the Evolution-Data Optimized (EVDO) data standard. EVDO is a wireless radio broadband data standard adopted by many CDMA mobile phone service providers, and is standardized by 3GPP2, as part of the CDMA2000 family of standards. The initial design of EVDO was developed for a greater-than-2-Mbps downlink for stationary communications and given the numerical designation IS-856.

Compared to EDGE networks employed by GSM networks, the EVDO standard is significantly faster and provides access to mobile devices with air interface speeds of up to 2.4 Mbps with Revision 0 and up to 3.1 Mbps with Revision. A. There are other competing standards that include HSDPA, WiMAX, and other such wireless broadband standards.

EVDO Revision A is becoming the successor to the first revision of the standard, EVDO Revision 0. Revision A offers fast packet establishment on both the forward and reverse links along with air interface enhancements that reduce latency and improve data rates. In addition to the increase in the maximum burst downlink rate from 2.45 Mbps to 3.1 Mbps, Revision A is a significant improvement in the maximum uplink data rate, from 153 kbps to a maximum uplink burst rate of 1.8 Mb/s. The progressive evolution from the EVDO Revision A specification includes the EVDO Revision B and Revision C specifications. These future revisions provide additional features such as higher downlink and uplink data rates.

Major carriers continue to upgrade their wireless broadband communication systems and architecture, and in 2007 some carriers have announced a plan to upgrade EVDO networks from Revision 0, also referred to as "Rev 0", to Revision A, also referred to as "Rev A." Like most deployments, it is expected that the upgrade from Rev 0 to Rev A will be a gradual process where there will be some degree of coexistence between EVDO Rev 0 and Rev A within a carrier network system. The coexistence between different wireless networking standards may be localized or may span a much broader geographic area.

The Rev 0 and Rev A specification comprise various protocols each having many sub-types. Each protocol also has a default sub-type that is supported by all Access Terminals (ATs) and Access Nodes (ANs), which are compliant with the High Rate Packet Data (HRPD) specification. The HRPD specification has undergone a revision in which new subtypes for existing protocols and also new protocols and applications are introduced. By introducing these new protocol subtypes, new protocols and new applications, the AT capabilities are enhanced.

However, determining the wireless broadband communication standards for a particular wireless broadband coverage area can be ambiguous. For example, when a 1×CDMA capable handset or PC card detects the CDMA Revision associated with a particular base station, the process for determining the Revision number is determined by looking at the P_REV number in the Sync message. But unlike previous CDMA revision conventions, the Revision number in the Sync message for the EVDO Rev 0 standard and the Rev A standard are identical, i.e. the revision number for both specifications is 1. Thus, the determination of the Revision number for wireless broadband communications is ambiguous.

Additionally, the AT's reliance on a Sync message is further complicated by the AT moving between coverage areas that are Rev 0 compliant and Rev A compliant. This can be observed by how carriers set their Max Rev and Min Rev in a Sync Message. Determining whether an EVDO device is operating in the new Rev A mode or Rev 0 in a given network can be ambiguous because the AT can operate in any of the multiple personalities the AT has negotiated during the previous session negotiations throughout the wireless network.

It would therefore be beneficial to overcome the ambiguity associated with the Sync message and determining data rates capability for packet data communications. Additionally, it would assist the user or subscriber to have a real-time indication of the data rate capability in a particular coverage area. More particularly, it would be beneficial to allow the AT to determine the difference between a Rev 0 and a Rev A coverage area without relying on the Sync message.

SUMMARY

A wireless device, system, and method that determines a data rate capability for communicating packet data is described. The wireless device comprises a RF component, a controller, and a means for enabling communications. The RF component is configured to communicate a plurality of packet data at a first data rate capability and a second data rate capability, in which the second data rate is faster than the first data rate. The controller is communicatively coupled to RF component, and the controller is configured to monitor a physical layer data field value, a forward traffic channel data field value, and a reverse traffic channel data field value. The physical layer data field value is associated with the physical transmission of packets from the RF component. The forward traffic channel data field value is associated with forward channel communications, and the reverse traffic channel data field value that is associated with reverse channel communications. The means for enabling communications at the second data rate capability occurs when the physical layer data field value, the forward traffic channel data field value, and the reverse traffic channel data field value indicate that communications are supported for the second data rate capability.

Additionally, a wireless communication system is described that supports at least two different peak data rates capability for communicating the packet data. The wireless communication system comprises a first base station, and second base station, and the wireless device. The first base station is configured to communicate the packet data at a first data rate capability, and the second base station is configured to communicate the packet data at the second data rate capability.

Furthermore, a method for the wireless communication device to derive a data rate capability to communicate with the base station that is operatively coupled to a network system is described. The method comprises determining the physical layer data field value, determining the forward traffic channel data field value, and determining the reverse traffic channel data field value. The method then proceeds to enable communications at the second data rate capability when the physical layer data field value, the forward channel data field value, and the reverse channel data field value indicate that communications are supported for the second data rate capability.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and wireless device described hereinafter may vary as to configuration and as to details. Additionally, the method may vary as to details, order of the actions, or other variations without departing from the illustrative method disclosed herein.

A wireless device, wireless network system and method are described that overcome the ambiguity associated with the Sync message and determining data rates capability for packet data communications in a network system that supports at least two different data rates capability. Additionally, a real-time indication of the data rate capability in a particular coverage area is also described.

In the illustrative embodiment, a wireless device such as a PC card can distinguish between an EVDO Revision 0 and an EVDO Revision A coverage area without relying exclusively on the Sync message. However, the illustrative embodiment is not intended to be limiting and it shall be appreciated by those of ordinary skill in the art that the devices, systems, and methods described herein may be applied to future revisions such as EVDO Revision B, EVDO Revision C, and any other standards that rely on Sync messages emanating from base stations or access nodes in wide area networks. By way of example of not of limitation, other wireless wide area networks include W-CDMA, UMTS, TD-SCDMA, EDGE, and WiMAX networks.

Figure 1:
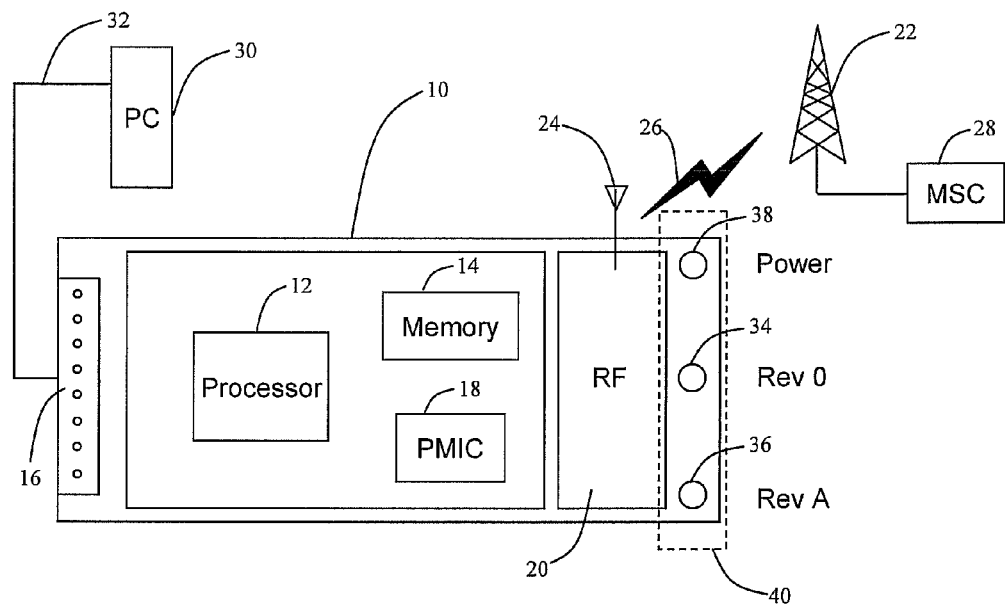
FIG. 1 shows a block diagram of an illustrative wireless device such as a wireless PC card modem.

Referring to FIG. 1, there is shown a block diagram of an illustrative wireless device such as a wireless PC card modem. The wireless PC card 10 interfaces with a computing device. The computing device may be a notebook computer, a desktop computer, a personal digital assistant (PDA), or any other such device configured to receive the wireless device. Although the illustrative embodiment is a wireless PC card modem, the device, systems and methods described herein can be applied to other wireless devices such as a wireless handset configured to support voice communications, a mobile handset, a personal digital assistant, a smart phone, a wireless Internet appliance, a thin client, and other such devices. More generally, the wireless device may be referred to as a mobile station or an access terminal.

The illustrative PC card 10 has the form factor of a peripheral interface for a laptop computer or notebook computer that conforms to the Peripheral Component MicroChannel Interconnect Architecture (PCMCIA) standard. The illustrative wireless PC card modem 10 comprises a processor 12 coupled to memory 14 and to input/output hardware interface 16. A power source (not shown) supplies power to the wireless PC card modem 10. A Power Management Integrated Circuit (PMIC) 18 is also communicatively coupled to the processor 12 and regulates the use of power by the wireless PC card modem 10. Additionally, an RF component 20 is configured to wirelessly communicate with an illustrative base station 22. A physical interface between the electronic device and the computing device is required. In the illustrative embodiment, the hardware interface 16 supports having the wireless PC card modem 10 operatively coupled to the PC 30. An illustrative bus 32 permits data to be communicated between the illustrative PC 30 and the wireless PC card modem 10. Although the illustrative electronic device is a wireless PC card modem 10, any other electronic device having a means for physically interfacing with a computing device having an operating system (OS) can be used.

The wireless PC card modem communicates wirelessly by transmitting and receiving electromagnetic energy in the radio frequency band via an antenna 24 coupled to the RF component 20. A RF communication link 26 is created with the base station 22 for exchanging broadband data communications. Although a single base station 22 is depicted, the wireless PC card modem 10 is capable of communicating with one or more base stations, where each base station is generally responsible for managing packet data communications within a defined geographic area.

The RF component 20 in the illustrative PC card 10 is configured to communicate a plurality of packet data at a first data rate capability and a second data rate capability, in which the second data rate is faster than the first data rate. In the illustrative embodiment, the first data rate capability employs the EVDO Revision 0 standard and the second data rate capability employs the EVDO Revision A standard.

There are visual indicators disposed on the PC card 10 that indicate the revision number used for packet data communications. The first indicator 34 is associated with the Revision 0 standard; the second indicator 36 is associated with the Revision A standard; and the third indicator 38 shows whether sufficient power is being provided to the PC card 10. Depending on the network system, the PC card 10 is configured to determine the applicable data rate for communicating data packets. The illustrative network system may include certain coverage area that only provide Revision 0 data throughputs, other coverage areas may only provide Revision A data throughputs, and some coverage areas may provide both Revision A and Revision 0 data throughputs.

A dedicated color for on the illustrative PC card 10 can be used to easily identify when the illustrative PC card is in the EVDO Revision A coverage area. Alternatively, a multi-color LED may be used that shows the Rev A coverage area. In the illustrative embodiment, the PC card 10 determines whether it is operating in a Rev 0 mode or a Rev A mode as described above. By way of example and not of limitation, the color may be blue and may blink at a faster rate depending on the bandwidth speeds in the forward channel and reverse channel. Thus, in Rev A the blinking rate may be faster than the blinking rate for Rev 0 when the illustrative PC card is connected to the network. Additionally, the illustrative LED may be configured to emit a solid color when the illustrative PC card is not connected to the network, but has been powered up. Furthermore, the illustrative LED may blink at a slow rate when a network connection has been established, or when the PC card is in a dormant mode where the PC card is not actively communicating packets with the network. Further still, the illustrative LED may be configured to blink at an even faster rate when the illustrative PC card is connected to the network.

Figure 2:
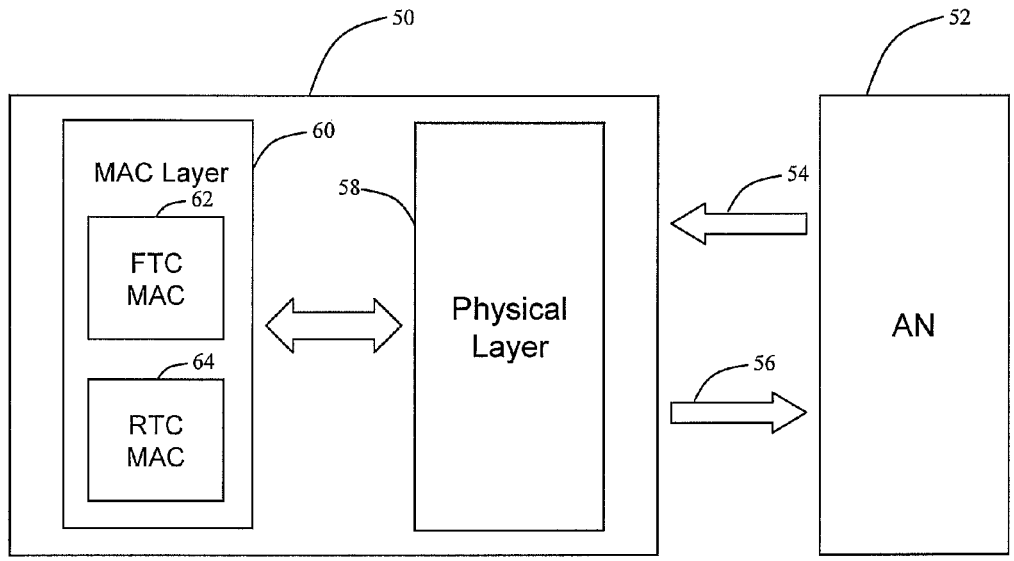
FIG. 2 shows an illustrative access node and access terminal in a high data rate communication system.

Referring to FIG. 2 and FIG. 1, there is shown an illustrative access node and an access terminal in a high data rate (HDR) communication system. The wireless device 10 may also be referred to as an access terminal (AT) 50 or a mobile station. By way of example, the AT is a CDMA2000 EVDO PC card in data-only mode that is Rev 0 and Rev A compliant. The base station 22 may also be referred to as an access node (AN) 52. The AN is a point in a network that allows a subscriber to access the network, and the AN provides data connectivity between a packet switched data network (typically the Internet) and the AT and covers one or more subnets. It shall be appreciated by those of ordinary skill in the art that the terms subnets and coverage area can be used to refer to a geographic area that supports full duplex wireless communications.

In operation, the AT 50 is in wireless communication with the AN 52. The "forward" channel 54 refers to communications from the AN 52 to the AT 50, and the "reverse" channel 56 refers to transmission from the AT 50 to the AN 52. The forward channel 54 may include a plurality of channels, including a Sync message.

FIG. 2 also shows a plurality of layers associated with the AT 50. The layers include a Physical Layer 58 and a medium access control (MAC) layer 60. Higher layers are located above the MAC layer, but are not shown. The MAC layer 60 offers certain services to the higher layers including services that are related to the forward channel 54 and reverse channel 56. The physical layer 58 is located below the MAC layer 60. The MAC layer 60 requests certain services from the physical layer 58. These services are related to the physical transmission of packets with the AN 52. Additionally, the MAC layer 60 receives one or more flows from the higher layers. A flow is a stream of data from a user source, with some set of transmission requirements, usually associated with some particular application. Typically, a flow corresponds to specific application, such as browsing the Web, voice over IP (VoIP), video telephony, file transfer protocol (FTP), and other such applications.

In operation, data packets communicated between the AT 50 and the AN 52 are communicated as a data rate supported by both the Access Node 52 and the Access Terminal 50. With respect to the older EVDO Revision 0 standard, there are default protocol subtypes and there is no need to negotiate protocol subtypes for communications between the AT 50 and the AN 52. The more recent EVDO Revision A standard has introduced a variety of new features, and these new features are delivered in the form of more recent non-default subtype protocols. These non-default protocol subtypes must be agreed upon during session negotiation between the AT 50 and the AN 52. The Advanced Mobile Subscriber Software (AMSS) stores all the default and negotiated subtypes in a single non-volatile (NV) item called the HDR SCP Protocol Subtype NV item.

To determine the wireless data rates capability in a network having at least two different wireless standards, the wireless device 10 or access terminal 50 monitor the overhead messages that the base station is broadcasting on the control channel. During session negotiation there is a forward traffic channel data field value that is associated with the FTC MAC protocol type. Additionally, there is a reverse traffic channel data field value that is associated with the RTC MAC protocol type. Further still, there is a physical layer data field value that is associated with the Physical Layer protocol type.

A controller in the access terminal 50 is configured to monitor the physical layer data field value, the forward traffic channel data field value, and the reverse traffic channel data field value. The illustrative controller may be the processor 12 operating in conjunction with the memory 14, in which the memory 14 is configured to store the physical layer data field value, the forward traffic channel data field value, and the reverse traffic channel data field value. Alternatively, the illustrative controller may be a logic module in an ASIC that located within the RF component 20.

A means for enabling communications at the second data rate capability, e.g. the faster EVDO Rev A data rate, takes place when the physical layer data field value, the forward traffic channel data field value, and the reverse traffic channel data field value reflect that communications are supported for the faster data rate. Thus, there is little or no reliance on the Sync message to determine the best available data rate for packet communications. In the illustrative embodiment, the means for enabling communications makes a decision that monitors the protocol subtypes for the Physical Layer, the FTC MAC, and the RTC MAC.

The illustrative Table below shows the protocol type entry in the HDR SCP Protocol Subtype that stores the currently negotiated protocol subtype values. The data type is 2×26 bytes and contains negotiated protocol subtype ID values (0x000X) for twenty-six protocol type entries. The order of entry is predetermined as displayed below. In particular the Table shows the possible protocol subtype values for the first five protocol types in the HDR SCP Protocol Subtype NV item. Out of the 26 protocol type entries currently available, the protocol subtypes to be negotiated for the improved data throughputs introduced with Rev A are Subtype 2 Physical Layer, Enhanced FTC MAC, and Subtype 3 RTC MAC protocols are tied to Physical Subtype 2 protocol. The subtype values enable the illustrative PC card 10 to determine whether the PC card can operate in Rev A mode or not.

| | Protocol Type | | Protocol Subtype | |
|---|---|---|---|---|
| Order | Name | ID | Name | ID |
| 1 | Physical Layer | 0x00 | Default | 0x0000 |
| | | | Subtype 1 | 0x0001 |
| | | | Subtype 2 | 0x0002 |
| 2 | CC MAC | 0X01 | Default | 0x0000 |
| | | | Enhanced | 0x0001 |
| 3 | AC MAC | 0x02 | Default | 0x0000 |
| | | | Enhanced | 0x0001 |
| 4 | FTC MAC | 0x03 | Default | 0x0000 |
| | | | Enhanced | 0x0001 |
| 5 | RTC MAC | 0x04 | Default | 0x0000 |
| | | | Subtype 1 | 0x0001 |
| | | | Subtype 2 | 0x0002 |
| | | | Subtype 3 | 0x0003 |

... 26: Other protocol types

Figure 3:
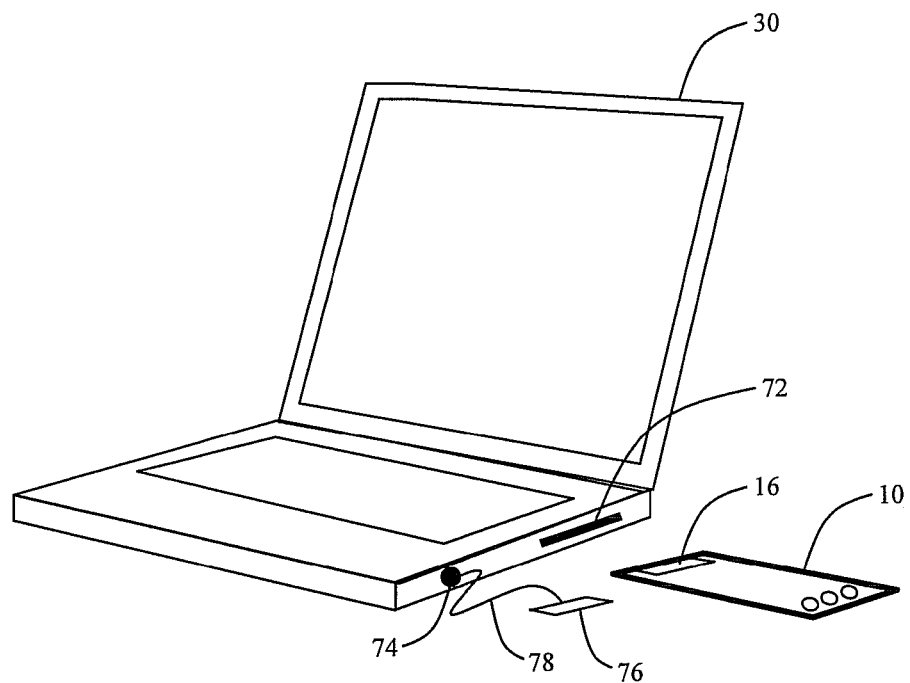
FIG. 3 shows an illustrative personal computer receiving the illustrative wireless PC card modem.

Referring to FIG. 3, there is shown an illustrative personal computer receiving the illustrative wireless PC card modem. The illustrative personal computer is a notebook computer 30. The wireless PC card modem 10 comprises an input/out hardware interface 16, which interfaces with PC card slot 72 on the notebook computer 30. The illustrative wireless PC card modem 10 is slidably installed and/or removed from the PC card slot 72. The illustrative PC card modem 10 is not situated entirely within the notebook computer 50 so that visual indicator elements are visible to the user as described above. By way of example and not of limitation, the status indicators are light emitting diodes (LEDs) having at least one color that can blink and/or remain a single solid color.

In an alternative embodiment, another computer interface may also be used to communicate with the illustrative computer. For example, a Universal Serial Bus (USB) interface 74 having a PC card interface 76 is operatively coupled to the PC card hardware interface 16 and to a USB connection on the notebook computer 30. Thus, the PC card modem 16 is physically coupled to the notebook computer via the USB cable 78. System requirements for the personal computer 30 may include running Microsoft® Windows®2000 or XP, a Standard Type II PC card slot on the PC and/or one or more USB connections. Software associated with the wireless PC card may have to be loaded onto the personal computer. The software may be embodied as computer instructions stored on a CD-ROM or other such media configured to store computer instructions.

Figure 4:
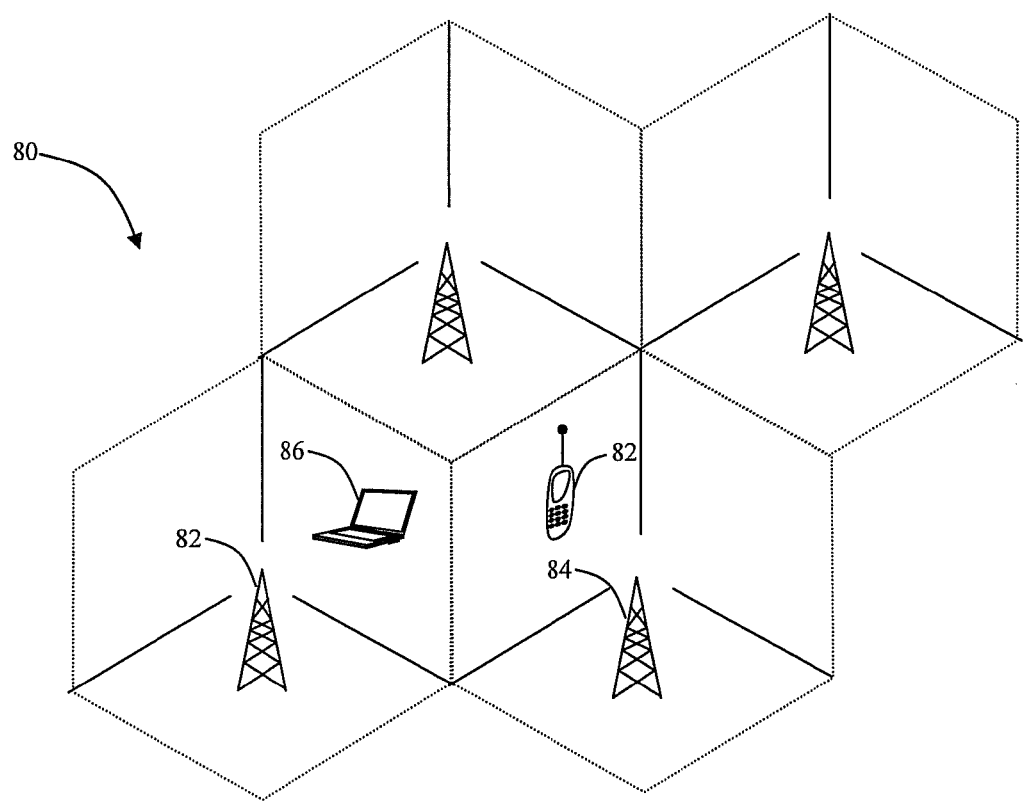
FIG. 4 shows a network system having base stations configured to communicate at different wireless data rates capability.

Referring to FIG. 4, there is shown a network system having base stations configured to communicate at different wireless data rates capability. The illustrative network 80 includes a plurality of base stations. For illustrative purposes only, a first base station 82 is configured to communicate packet data at a first data rate capability that complies with the EVDO Revision 0 standard. A second base station 84 is configured to communicate packet data a second data rate capability that complies with the faster EVDO Revision A standard. The total coverage area is determined by combining the area covered by each base station.

Two illustrative wireless devices similar to the wireless devices described above are also shown. One of the wireless devices is a notebook computer 86 that comprises a PC card that supports data communications using at least two different wireless broadband data standards. Additionally, the wireless handset 88 supports voice communications and at least two different wireless broadband data standards. Each of the wireless devices is configured to determine the data rate capability supported in a particular location, and the "optimal" data rate in certain locations that support both wireless broadband data standards. Thus, the wireless devices, systems and methods described can be applied to a network system that has certain cells communicating packet data at either a first data rate capability or a second data rate capability, and can be applied to a network system that supports the first data rate capability and second data rate capability in the same location. In the latter instance where the network system supports at least two different data rates capability, the wireless devices, systems and methods can be used to determine the "optimal" wireless broadband standard to employ that provides the highest throughput based on available network resources.

Figure 5:
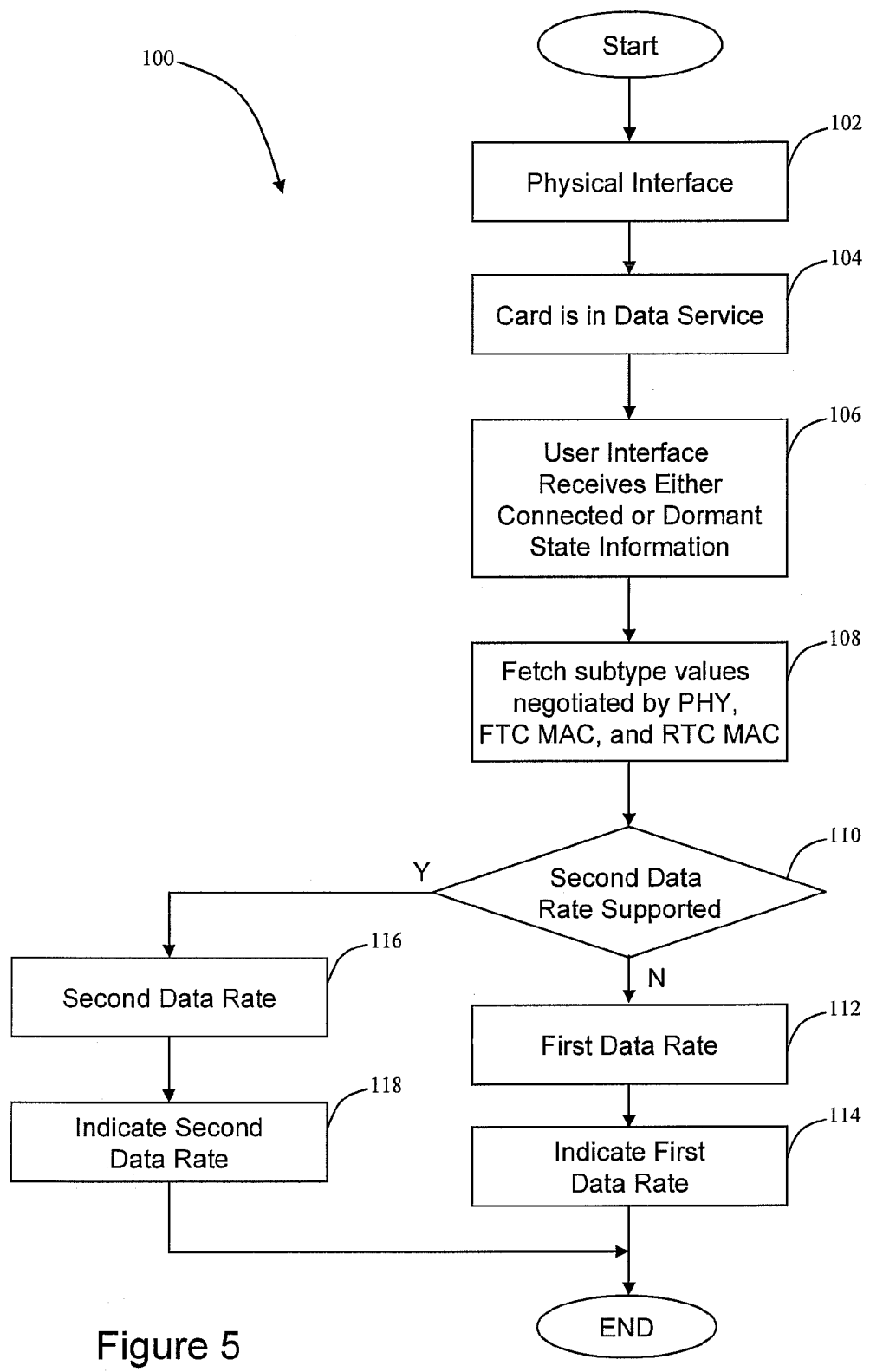
FIG. 5 shows an illustrative flowchart for the communications performed between by the wireless devices and a base station.

Referring to FIG. 5 there is shown an illustrative flowchart of the communications performed between the electronic device and the network. The method is initiated at block 102 where a physical interface between the electronic device and the computing device is performed. Generally, any electronic device having a means for physically interfacing with the computing device can be used. In one illustrative embodiment, the wireless PC card 10 is slidably coupled to the PC card slot of the PC 30.

The method then proceeds to block 104 where a determination is made that the card is in data service. The type of data service that is available will depend on the network. At block 106, the user interface receives either "connected" or "dormant" state information.

The method then proceeds to block 108 where the negotiated protocol subtype values for the Physical Layer protocol type, the Forward Traffic Channel (FTC) MAC protocol type, and the Reverse Traffic Channel (RTC) MAC protocol type are gathered. Generally, the physical layer data field value, the forward traffic channel data field value, and the reverse traffic channel data field value are determined. More particularly, the determining of the physical layer data field value, the forward traffic channel data field value, and the reverse traffic channel data field value further comprises negotiating the data field values in a plurality of local coverage areas, so that the method described herein is repeatedly occurring while the card is in data service.

At decision diamond 110 the determination is made whether the data field values support the faster second data rate, which for illustrative purposes is the Rev A standard. If one of the data fields does not support the second data rate capability, then method proceeds to block 112 and communicates using the first data rate capability. An indication may be provided at block 114 that the packet data communications are proceeding using the first data rate capability, e.g. Rev 0 standard.

If the determination is made at decision diamond 110 that the physical layer data field value, the forward channel data field value, and the reverse channel data field value support the faster second data rate, then the method proceeds to block 116 and enables communications using the second data rate standard, e.g. EVDO Rev A. The method may then proceed to block 118 where an indication is provided that packet data communications are being performed using the second data rate capability, e.g. Rev A standard.

The wireless devices, system, and method described above overcome the ambiguity associated with the Sync message and determining data rates capability for packet data communications. Additionally, the wireless device and method described assists the user or subscriber in having a real-time indication of the data rate capability in a particular coverage area. Furthermore, the wireless devices, system and method allow the AT to determine the difference between the EVDO Revision 0 and the EVDO Revision A standard without relying on the Sync message.

Thus, it is to be understood that the foregoing is a detailed description of illustrative embodiments, and the scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless device that derives a data rate capability for communicating packet data, the wireless device comprising:

a RF component configured to communicate a plurality of packet data at a first data rate capability and a second data rate capability, in which the second data rate is faster than the first data rate;

a controller communicatively coupled to the RF component, the controller configured to monitor a physical layer data field value that is associated with the physical transmission of packets from the RF component, a forward traffic channel data field value that is associated with forward channel communications, a reverse traffic channel data field value that is associated with reverse channel communications;

a memory communicatively coupled to the controller, the memory configured to store the physical layer data field value, the forward traffic channel data field value, and the reverse traffic channel data field value; and a means for enabling communications at the second data rate capability when the physical layer data field value, the forward traffic channel data field value, and the reverse traffic channel data field value indicate that communications are supported for the second data rate capability.

2. The wireless device of claim 1 wherein the forward traffic channel data field and the reverse traffic channel data field are associated with a media access control (MAC) layer.

3. The wireless device of claim 2 wherein the first data rate capability complies with the EVDO Revision 0 standard.

4. The wireless device of claim 3 wherein the second data rate capability complies with the EVDO Revision A standard.

5. The wireless device of claim 3 wherein the wireless device comprises a wireless handset configured to support voice communications.

6. The wireless device of claim 3 wherein the wireless device comprises a PC card that is configured to interface with a computer.

7. The wireless device of claim 5 further comprising a visual indicator disposed on the PC card that indicates the revision number used for packet data communications.

8. A wireless communication system that supports at least two different data rates capability for communicating packet data, the wireless communication system comprising:

a first base station configured to communicate a plurality of packet data at a first data rate capability;

a second base station configured to communicate the packet data at a second data rate capability, in which the second data rate capability is faster than the first data rate capability; and a wireless device configured to communicate the packet data to the first base station and the second base station, the wireless device further comprises, a RF component configured to communicate the packet data at the first data rate capability and the second data rate capability, a controller communicatively coupled to the RF component, the controller configured to monitor a physical layer data field value that is associated with the physical transmission of packets from the RF component, a forward traffic channel data field value that is associated with forward channel communications, a reverse traffic channel data field value that is associated with reverse channel communications, a memory communicatively coupled to the controller, the memory configured to store the physical layer data field value, the forward traffic channel data field value, and the reverse traffic channel data field value; and a means for enabling communications at the second data rate capability when the physical layer data field value, the forward traffic channel data field value, and the reverse traffic channel data field value indicate that communications are supported for the second data rate capability.

9. The wireless system of claim 8 wherein the first data rate capability complies with the EVDO Revision 0 standard.

10. The wireless system of claim 9 wherein the second data rate capability complies with the EVDO Revision A standard.

11. The wireless system of claim 9 wherein the wireless device comprises a wireless handset configured to support voice communications.

12. The wireless system of claim 9 wherein the wireless devices comprises a PC card that is configured to interface with a computer.

13. The wireless system of claim 12 further comprising a visual indicator disposed on the PC card that indicates the revision number used for packet data communications.

14. A method for a wireless communication device to derive a data rate capability to communicate with a base station operatively coupled to a network system, the method comprising:

determining a physical layer data field value that is associated with a physical transmission of packets from a RF component, the physical layer data field value configured to distinguish between communicating a plurality of packet data at a first data rate capability and a second data rate capability, in which the second data rate is faster than the first data rate;

determining a forward traffic channel data field value that is associated with forward channel communications, the forward channel data field value configured to distinguish between the first data rate capability and the second data rate capability;

determining a reverse traffic channel data field value that is associated with reverse channel communications, the reverse channel data field value configured to distinguish between the first data rate capability and the second data rate capability; and enabling communications at the second data rate capability when the physical layer data field value, the forward channel data field value, and the reverse channel data field value indicate that communications are supported for the second data rate capability.

15. The method of claim 14 wherein the determining of the physical layer data field value, the forward traffic channel data field value, and the reverse traffic channel data field value further comprises negotiating the data fields values in a plurality of local coverage areas.

16. The method of claim 14 wherein the forward traffic channel data field is associated with a media access control (MAC) layer.

17. The method of claim 14 wherein the reverse traffic channel data field is associated with a media access control (MAC) layer.

18. The method of claim 14 wherein the first data rate capability complies with the EVDO Revision 0 standard.

19. The method of claim 18 wherein the second data rate capability complies with the EVDO Revision A standard.

* * * * *